F. F. ENTER.
AUTOMOBILE WHEEL RIM.
APPLICATION FILED AUG. 23, 1915.

1,206,756.

Patented Nov. 28, 1916.

Inventor
F. F. Enter

By Watson E. Coleman
Attorney

UNITED STATES PATENT OFFICE.

FRED F. ENTER, OF CUYAHOGA FALLS, OHIO.

AUTOMOBILE-WHEEL RIM.

1,206,756.  Specification of Letters Patent.  Patented Nov. 28, 1916.

Application filed August 23, 1915. Serial No. 46,916.

*To all whom it may concern:*

Be it known that I, FRED F. ENTER, a citizen of the United States, residing at Cuyahoga Falls, in the county of Summit and State of Ohio, have invented certain new and useful Improvements in Automobile-Wheel Rims, of which the following is a specification, reference being had to the accompanying drawings.

This invention comprehends certain new and useful improvements in automobile wheel rims of the demountable type and has for its primary object an improved construction of device of this character possessing the desirable characteristics of rigidity and strength, which will have no bolts, no cross-cut in the rim to admit water into the tire casing or shoe and which is so constructed and arranged that a tire can be replaced in a minimum of time.

A further object of the invention is a demountable wheel rim which can be very easily manufactured and not liable to get out of order or become loose in service, and the invention also aims to generally improve devices of this class so as to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawing in which—

Figure 1:
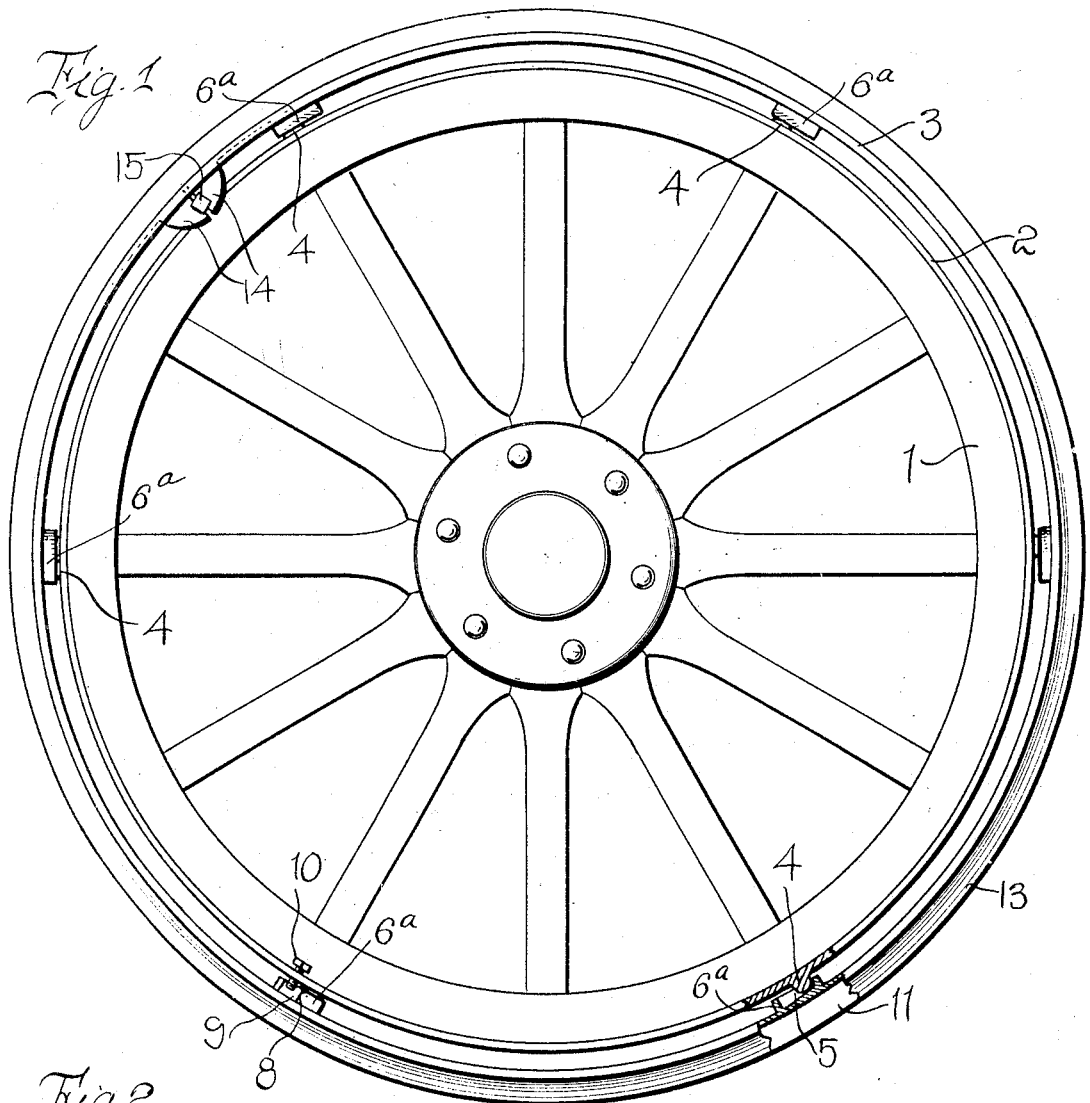
Figure 2:
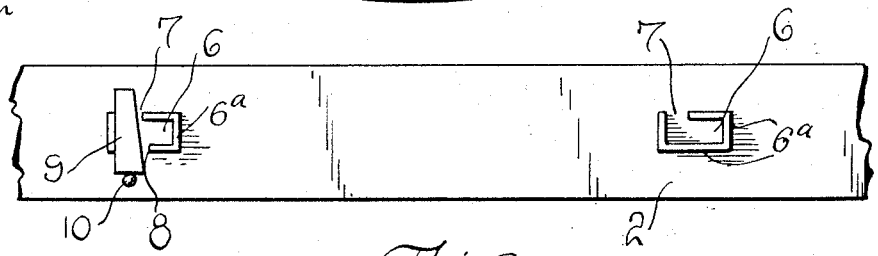
Figure 3:
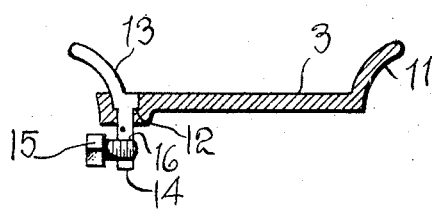

Figure 1 is a side elevation of a demountable wheel rim embodying the improvements of my invention, a part being broken away. Fig. 2 is a plan view of a portion of the tire holding rim; and Fig. 3 is a transverse sectional view through the rim.

Corresponding and like parts are referred to in the following description and designated in all of the views of the accompanying drawing by like reference characters.

Referring to the drawing the numeral 1 designates the felly of a wheel of any desired construction or design except as hereinafter noted; 2 designates the felly band which may be secured to the felly in any desired way; and 3 designates the rim in which the pneumatic tire is held, as will be hereinafter more specifically described.

The felly band 2 is formed on its outer face with any desired number of lugs 4, the same being preferably disposed at equal intervals apart around the circumference of the band and preferably at the middle thereof, said lugs being preferably formed on opposite sides, circumferentially considered, with beveled faces 5, as shown. The rim 3 like the band 1 is of one piece, without any cross-cut or the like to admit water into the tire and is provided with a plurality of circumferentially elongated slots 6 defined by the inwardly directed flanges 6ª and designed to register with the lugs 4 and one of the flanges cut away or open as indicated at 7, whereby, as will be evident, the rim may be very easily slipped into place over the band until the lugs 4 enter through the openings 7 into the slots 6, whereupon a slight circumferential movement imparted to the rim will cause the lugs to be accommodated and housed in the closed ends of the slots and all possibility of displacement by a transverse movement will be obviated. One of the slots 6 is not only formed with one side open for a portion of its length but with the opposite flange open as indicated at 8, whereby a locking wedge 9 may be slipped in through said openings against the adjacent lug and thereby securely prevent any displacement by an initial circumferential and subsequent lateral movement, and to hold the wedge 9 in place I provide a set screw 10 or similar fastening device working in an opening formed in the rim and adapted to abut against the outer or larger end of the wedge. Preferably, the lugs 4 are beveled as at 5, as hereinafter specified, whereby the lugs will be of wedge shape or form, and preferably the bottoms of the rim slots 6 are wedge shape in the opposite direction, so that when the rim is turned circumferentially these wedges will slide upon each other sufficient to take up the slight variation in the diameters of the band and rim.

The rim 3 is formed on one side (preferably the inner) with a tire retaining or holding ring 11 rolled integrally with the rim and its other or outer side is formed with a circumferentially extending annular and outwardly facing groove 12 pressed therein to receive the other tire holding ring 13. This latter is split, as shown and at the split or ends is formed with lugs 14 adapted to extend inwardly through a slot or opening 15 formed in the rim, a threaded opening 16 being formed of two semi-circular and transversely extending grooves in the opposing walls at the split portion of the ring 13 to receive an expanding set screw or cap bolt 17 so as to lock this ring in position.

From the foregoing description in connection with the accompanying drawing, it will be seen that I have provided a very durable and efficient construction of automobile rim which may be very easily applied to the wheel or removed therefrom and in which the tire holding rim 3 is so formed that the operation of removing a shoe or casing and replacing it can be very quickly and easily performed.

While the accompanying drawing illustrates what I believe to be the preferred embodiment of my invention, it is to be understood that the invention is not limited thereto but that various changes may be made in the construction, arrangement and proportions of the parts without departing from the scope of the invention as defined in the appended claims.

I claim:

1. A device of the character described, including a felly band formed on its outer face with lugs, a tire holding rim adapted to be slipped upon said band and formed with circumferentially elongated slots afforded by inwardly directed flanges, a portion of one side flange being cut away to admit of the passage of said lugs whereby a subsequent circumferential adjustment of the rim will cause the lugs to be received in the closed end portions of said slots, one of said slots having both side flanges open instead of merely one, a wedge insertible across the last named slot through the open portions of the side flanges, for the purpose specified, and withdrawable means carried by said rim and engageable with said wedge to hold it in position.

2. A device of the character described, including a felly band formed on its outer face with lugs, a tire holding rim adapted to be slipped upon said band and formed with circumferentially elongated slots afforded by inwardly directed flanges, a portion of one side flange being cut away to admit of the passage of said lugs whereby a subsequent circumferential adjustment of the rim will cause the lugs to be received in the closed end portions of said slots, one of said slots having both side flanges open instead of merely one, a wedge insertible across the last named slot through the open portions of the side flanges, for the purpose specified, and withdrawable means carried by said rim and engageable with said wedge to hold it in position, the lugs being wedge shaped in one direction and the closed ends of the rim slots being wedge shaped in the opposite direction, as and for the purpose set forth.

In testimony whereof I hereunto affix my signature in the presence of two witnesses.

FRED F. ENTER.

Witnesses:
WALTER HERBURT,
RUTH WHITESTINE.